Patented Mar. 16, 1926.

1,576,531

UNITED STATES PATENT OFFICE.

WILLIAM MENDEL, OF BEVERLY, NEW JERSEY.

MANUFACTURE OF FILAMENTS AND FILMS FROM VISCOSE.

No Drawing. Original application filed April 29, 1925, Serial No. 26,825. Divided and this application filed April 29, 1925. Serial No. 26,827.

*To all whom it may concern:*

Be it known that I, WILLIAM MENDEL, a citizen of the United States, residing at Beverly, in the county of Burlington and State of New Jersey, have invented a certain new and useful Improvement in the Manufacture of Filaments and Films from Viscose, whereof the following is a specification.

This is a division of my copending application Serial No. 26,825, filed April 29, 1925, and the invention herein claimed includes methods and means for chemically purifying cellulose products which are primarily formed by conversion of liquid viscose (cellulose sulphocarbonate) to coagulated or precipitated cellulose complex. Viscose has a strong tendency to progressive decomposition with reversion of the cellulose to its insoluble and uncombined condition, and such reversion is facilitated and may be effected by the mere action of heat without the employment of chemicals, and my invention is applicable to filaments and films thus formed.

It is characteristic of all such products that the cellulose hydrate is not in a pure state, but mixed with free sulphur and its derivatives, for instance, sulphides, sulphites, sulphates and thiosulphates. Some of such impurities are soluble, but others are insoluble and increasingly difficult to remove, in accordance with the thickness of the filament or film. Sulphur and its derivatives in such products, detract from all of the qualities which make the latter valuable, especially their luster, strength and elasticity, and the presence of such deleterious matter is manifested by the opacity of the product and the dullness of its appearance.

Heretofore, attempts have been made to remove such impurities by treatment of such products with sulphites and sulphides, particularly the latter, and by the use of reducers such as bisulphite or formaldehyde, and oxidizers such as bleaching powder, permanganate of potash or sodium peroxide. However, the action of such materials is incomplete and extremely slow and, consequently, unsatisfactory.

I have discovered that such sulphurous impurities may be eliminated from such cellulose hydrate products by reaction of tri-sodium phosphate ($Na_3PO_4$) therewith; as such reaction converts the sulphur to soluble poly-sulphides and thio-sulphates. Therefore, my invention consists in the use of such reagent to effect the removal of such sulphurous impurities from such products.

My invention is advantageously employed in the manufacture of transparent and translucent films in extensive sheets and webs, which may be coagulated by heat upon drums, plates, or other suitable carriers and then subjected to the action of the tri-sodium phosphate.

Although the purification and clarification herein contemplated are effected most rapidly when the cellulose hydrate products are submerged in a hot saturated aqueous solution of tri-sodium phosphate; such a solution quickly becomes clogged with the soluble products of the reaction. Therefore, I find it preferable to use dilute solutions because, although a longer time is required, the desired result is more economically attained, but it is to be understood that tri-sodium phosphate is efficient for the purpose contemplated at any temperature and in any state of dilution.

The action of my invention may be effected with great rapidity. For instance, such a film .025 inch thick, of a dull yellowish-white chalky appearance; when boiled for two minutes in a saturated aqueous solution of tri-sodium phosphate becomes almost as clear and transparent as glass and, when dried, forms a web superior in transparency, strength and elasticity to others of that size which have been subjected to the action of ordinary reagents for a much longer time. Of course, the reaction in accordance with my invention is more rapid with filaments of less thickness.

Therefore, I find it preferable to utilize my invention as follows: In order that the reagent may uniformly affect the films, I wind the latter on suitable drums; then mount the drums on an ordinary dye jigger and wind the film from one drum to the other; subjecting them to the action of a three per cent aqueous solution of tri-sodium phosphate; preferably boiling for about ten minutes, more or less, depending on the thickness of the film. Thereafter, such sulphur bearing impurities which have been rendered soluble may be readily removed from the residual cellulose hydrate of the films, by merely rinsing the latter in water.

The films may then be dried, preferably against a polished surface and without further chemical treatment excel in brilliance, luster and elasticity and are perfectly clear and transparent, their luster being determined by the nature of the surface against which they have been dried, which may be more or less smooth or embody a pattern.

Although I have described what I consider a preferable method of carrying out my invention; I do not desire to limit myself to the precise details of construction, arrangement or procedure herein set forth, as it is obvious that various modifications may be made therein without departing from the essential features of my invention, as defined in the appended claims.

Specific claims for other processes wherein such products have been primarily formed in baths which include suitable acid, or salt, are respectively included in other applications for Letters Patent of the United States copending herewith.

I claim:

1. The process of manufacturing articles from viscose by precipitating such viscose by heat, and subjecting the same to the action of tri-sodium phosphate ($Na_3PO_4$).

2. The process of manufacturing articles from viscose by precipitating such viscose by heat, and subjecting the same to the action of tri-sodium phosphate ($Na_3PO_4$), in aqueous solution.

3. The process of manufacturing films and webs from viscose which includes solidifying such viscose in such forms, by heat, and treating the resultant product with tri-sodium phosphate in aqueous solution.

4. The method of eliminating sulphur and its derivatives residual in a viscose product which has been converted to cellulose hydrate by heat, by subjecting said product to the action of tri-sodium phosphate in aqueous solution, and redrying it.

5. The method of eliminating sulphur and its derivatives residual in a product formed by the action of heat on viscose, by intermittently subjecting said product to the action of tri-sodium phosphate in aqueous solution.

6. The process of treating viscose which has been subjected to a solidifying process, by heat, which consists in subjecting such product to the action of tri-sodium phosphate before finally drying it.

In testimony whereof, I have hereunto signed my name at Burlington, New Jersey, this twenty-seventh day of April, 1925.

WILLIAM MENDEL.